United States Patent [19]

Presley

[11] 4,196,365

[45] Apr. 1, 1980

[54] MAGNETIC MOTOR HAVING ROTATING AND RECIPROCATING PERMANENT MAGNETS

[76] Inventor: Doy Presley, 2209 Cordova Dr., Sanford, Fla. 32771

[21] Appl. No.: 921,441

[22] Filed: Jul. 3, 1978

[51] Int. Cl.$^2$ ............................................. H02K 7/06
[52] U.S. Cl. ...................................... 310/23; 310/80; 310/103
[58] Field of Search ....................... 310/23, 24, 34, 35, 310/80, 103

[56] References Cited

U.S. PATENT DOCUMENTS

| 3,636,391 | 1/1972 | Horner et al. | 310/24 |
| 3,688,136 | 8/1972 | Salverda | 310/103 X |

*Primary Examiner*—Donovan F. Duggan
*Attorney, Agent, or Firm*—Duckworth, Hobby, Allen & Pettis

[57] ABSTRACT

A magnetic motor comprises a rotary shaft and a rotating disc coupled to rotate with the shaft. The rotating disc includes first, second and third magnets positioned at 120° intervals about the face of the disc. A pivotally mounted bracket is symmetrically positioned about the shaft and includes fourth and fifth magnets which are aligned to repel the first, second and third magnets when the magnet on the bracket is positioned adjacent to a magnet on the rotating disc. The bracket has a first position in which the fourth magnet is positioned close to the disc and the fifth magnet is positioned away from the disc. The bracket also has a second position in which the fourth magnet is positioned away from the disc and the fifth magnet is positioned close to the disc. An electrical solenoid is coupled by linkage to the pivotally mounted bracket and works in combination with a timing cam and an electrical switch to forcefully displace the bracket into the first position as one of the rotating magnets is passing the top dead center position and to forcefully displace the bracket into the second position as one of the rotating magnets is passing the bottom dead center position. The relative movement of the pivoting bracket with respect to the rotating disc impart a rotational force to the shaft.

10 Claims, 6 Drawing Figures

MAGNETIC MOTOR HAVING ROTATING AND RECIPROCATING PERMANENT MAGNETS

BACKGROUND OF THE INVENTION

1. Field of the Invention

The present invention relates to magnetic motors, and more particularly, to magnetic motors having both rotating and reciprocating permanent magnets.

2. Description of the Prior Art

A variety of prior art magnetic motors have been developed based on the repulsion forces created by the interaction of similar poles of either electromagnets or permanent magnets.

U.S. Pat. No. 1,692,761 (Osser) discloses a magnetic motor having a plurality of fixed electromagnets, a rotating disc having iron core inserts and a cam/electrical switch assembly for selectively energizing the electromagnets.

U.S. Pat. No. 3,895,245 (Bode) discloses a magnetic motor composed of two counter-rotating discs having intermeshing gears and each carrying a plurality of permanent magnets radially arranged with the same poles at the periphery of both discs. A cam and an electrical switch coupled thereto selectively energize an electromagnet as the two discs rotate.

U.S. Pat. No. 3,879,622 (Ecklin) discloses a permanent magnet motor utilizing a spring-biased rotating magnetized member positioned between two permanent magnets. A magnetic shield alternately shields and exposes the members to the magnetic field to produce a reciprocating motion.

U.S. Pat. No. 3,899,703 (kinnison) discloses a permanent magnet motor having movable magnets and a diverter device which is switched between two positions for alternately diverting the magnetic fields of the stationary magnet. This systematic movement creates a repulsion force which causes the continued movement of the movable magnet.

U.S. Pat. No. 4,001,477 (Scholin) discloses a device for converting variations in magnetic force between two magnets, one rotating and one non-rotating, into reciprocating linear motion. This device includes a motor driven rotatable permanent bar magnet and a non-rotatable permanent bar magnet disposed adjacent thereto. The alternate attraction and repulsion resulting from the magnetic forces between the two magnets produce the reciprocating movement.

The following United States Patents disclose related types of permanent magnet motors: U.S. Pat. No. 689,483 (Gilman); U.S. Pat. No. 1,724,446 (Worthington); U.S. Pat. No. 1,859,643 (Worthington); U.S. Pat. No. 3,703,653 (Tracy) and U.S. Pat. No. 3,935,487 (Czerniak).

SUMMARY OF THE INVENTION

The present invention contemplates a permanent magnet motor comprising a rotating shaft and a rotating magnet coupled to rotate with the shaft and sweeping a disc-like area as the shaft rotates. A reciprocating magnet aligned to repel the rotary magnet is positioned adjacent to the area swept by the rotating magnet. The reciprocating magnet is movable toward and away from the rotating magnet. Means coupled to the reciprocating magnet is provided to forcefully displace the reciprocating magnet toward the rotating magnet as the rotating magnet is passing a top dead center position and for displacing the reciprocating magnet away from the rotating magnet after the rotating magnet has passed the bottom dead center position. The relative movement between the rotating magnet and the reciprocating magnet imposes a rotational force on the shaft.

DESCRIPTION OF THE DRAWING

The invention is pointed out with particularity in the appended claims. However, other objects and advantages together with the operation of the invention, may be better understood by reference to the following detailed description taken in connection with the following illustration wherein:

DESCRIPTION OF THE PREFERRED EMBODIMENT

In order to better illustrate the advantages of the invention and its contributions to the art, a preferred hardware embodiment of the invention will now be described in some detail.

Figure 1:
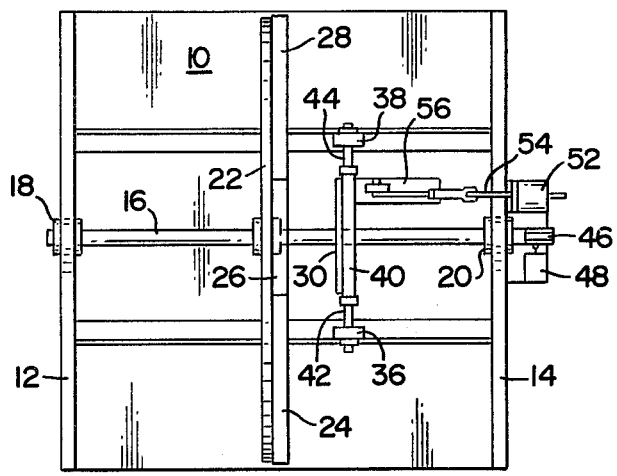
FIG. 1 is a view from above of the present invention.
Figure 2:
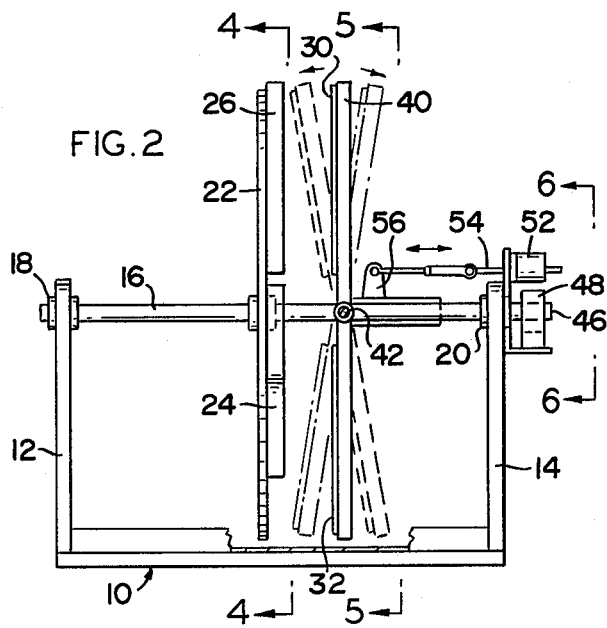
FIG. 2 is a front view of the magnetic motor illustrated in FIG. 1.

Referring now to FIGS. 1 and 2, a magnetic motor of the present invention includes a base 10 having a pair of upwardly extending support arms 12 and 14. A shaft 16 is rotatably coupled to support arms 12 and 14 by bearings 18 and 20.

Figure 3:
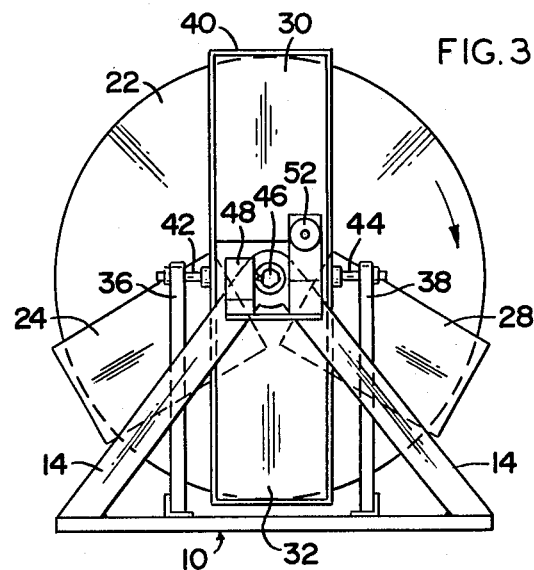
FIG. 3 is an end view of the magnetic motor illustrated in FIG. 2.
Figure 4:
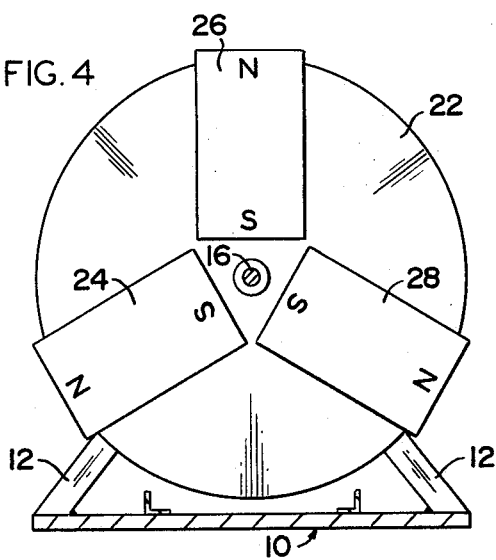
FIG. 4 is a sectional view of the magnetic motor illustrated in FIG. 2, taken along section line 4—4.

Referring now also to FIGS. 3 and 4, a disc 22 is rigidly coupled to shaft 16. Permanent magnets 24, 26 and 28 are spaced at equal 120° intervals about the face of disc 22 with the magnetic polarities indicated in FIG. 4.

Figure 5:
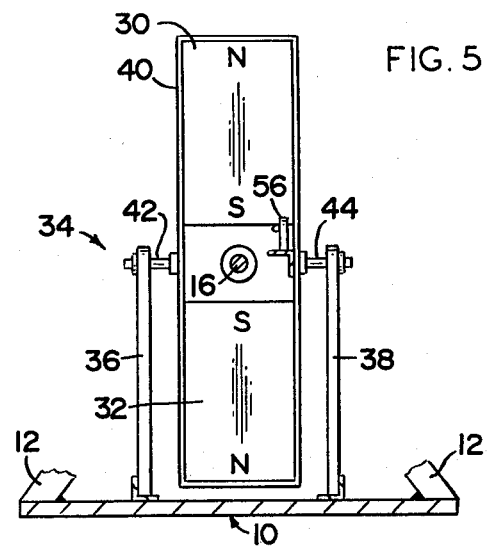
FIG. 5 is a sectional view of the magnetic motor illustrated in FIG. 2, taken along section line 5—5.

Referring now to FIGS. 2, 3 and 5, the magnetic motor also includes reciprocating magnets 30 and 32 mounted on a bracket assembly 34. Bracket assembly 34 includes a pair of vertically extending arms 36 and 38 and a frame 40 to which magnets 30 and 32 are secured. A shaft 42 extends between the upper portion of arm 36 and the central portion of bracket 40, while another shaft 44 extends between the upper portion of arm 38 and the central portion of the opposite side of bracket 40. Shafts 42 and 44 are freely mounted with respect to arms 36 and 38, but are rigidly attached to frame 40 and permit frame 40 to be pivotally displaced with respect to base 10. As can be seen, magnets 30 and 32 are symmetrically positioned with respect to shaft 16.

Figure 6:
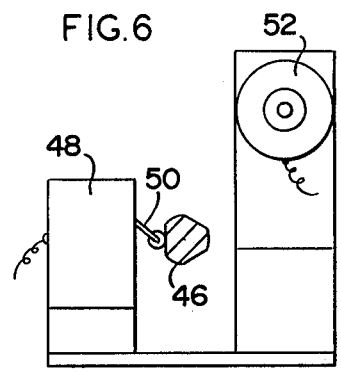
FIG. 6 is a partial sectional view of the magnetic motor illustrated in FIG. 2, taken along section line 6—6.

Referring now to FIGS. 1, 2 and 6, a magnetic motor of the present invention also includes means for forcefully displacing the reciprocating magnet assembly which includes magnets 30 and 32 with respect to the rotating disc 22 and magnets 24, 26 and 28. The means for displacing the reciprocating magnetic assembly with respect to the rotating magnetic assembly includes an actuator means and timing means.

The timing means is most clearly indicated by reference to FIGS. 2 and 6. A cam 46 is coupled to the end portion of shaft 16. In the preferred embodiment of the invention, cam 46 is a three lobed cam which is rigidly coupled to shaft 16 in order to precisely indicate the position of the rotating magnets with respect to the reciprocating magnets.

The actuator means of the present invention includes a source of electrical energy such as a 12 volt storage battery (not shown) and an electrical switch 48, including an arm 50 which is spring biased against the face of cam 46.

The actuator means of the present invention also includes an electric solenoid 52 having a shaft 54 which is spring biased to the retracted position. Shaft 54 of solenoid 52 is coupled to a bracket 56. The extension and retraction of shaft 54 displaces bracket 56 and causes a reciprocation or angular motion of frame 40 and hence magnets 30 and 32. This reciprocating motion of bracket 40 is indicated in FIG. 2 by dotted lines.

Rotary motion of disc 22 must be initiated either manually or by some other external force. As shaft 16 rotates, the high points on cam 46 displace arm 50 of switch 48. When these displacements occur, the contacts of switch 48 close and thus energize the electromagnet within solenoid 52. Actuation of solenoid 52 causes shaft 54 to be retracted which results in movement of magnet 32 to a position adjacent to but not touching the magnets upon the face of disc 22. As a result of the movement of bracket 40, magnet 30 is displaced to the maximum distance away from the face of disc 22.

The top dead center position of disc 22 is illustrated in FIG. 3 and is defined to be that relative positioning between bracket 40 and any magnet on disc 22 such that movement of bracket 40 toward the face of disc 22 could produce either counter clockwise, clockwise or no rotation of disc 22. This is a position of unstable equilibrium in which the maximum magnetic repulsion forces are present between magnet 30 and one of three magnets on the face of disc 22. The term "bottom dead center" defines a similar position with respect to magnet 32 and one of the three magnets on the face of disc 22.

The rotational alignment and design of cam 46 is structured such that magnet 32 will be forcefully displaced toward one of the three magnets on disc 22 as a rotating magnet passes the bottom dead center position. The mutual repulsive forces exerted between magnet 32 and the rotating magnet will impart an additional rotary force to disc 22, causing it to maintain RPM or to increase RPM. At the same time, magnet 30 is deflected away from the face of disc 22 into what is essentially its rest position. As disc 22 continues its rotation, cam 46 will displace arm 50 of switch 48 to de-energize solenoid 52 resulting in outward extension of shaft 54 which permits magnet 30 to be displaced toward the face of disc 22 as magnet 26 is passing the top dead center position. A spring (not shown) can be mounted between solenoid 52 and shaft 54 to bias shaft 54 to the extended position.

In an alternative embodiment of the invention, solenoid 52 can be a double acting solenoid which can both forcefully retract and extend shaft 54. In this embodiment, a pair of three lobed cams 46 in combination with a pair of switches 48 is required to activate solenoid 52 to extend three times and to retract three times during each revolution of disc 22. In the double acting solenoid embodiment, cams 46 must be designed so that solenoid 52 will be actuated every time a magnet passes either the top dead center or bottom dead center positions. In the spring biased embodiment of solenoid 52 it is important that solenoid 52 be electrically de-energized several degrees prior when a on disc 22 reaches the top dead center position as the comparatively weak spring biasing force causes bracket 40 to pivot to the first position more slowly than is the case when solenoid 52 is electrically actuated to displace bracket 40 more rapidly into the second position in which magnet 32 is adjacent to the face of disc 22.

The permanent magnet motor of the present invention has numerous uses. The rotary motion of shaft 16 can be utilized to turn a generator to produce electrical power. The rotary motion of shaft 16 can also be used to provide a source of mechanical energy. The permanent magnet motor of the present invention is also highly useful as an educational device to illustrate the interaction of the magnetic forces produced by groupings of magnets. The invention has a significant appeal to children as a toy as it produces various different types of sound and motion while requiring only a relatively low voltage power source.

It will be apparent to those skilled in the art that the disclosed permanent magnet motor may be modified in numerous ways and may assume many embodiments other than the preferred forms specifically set out and described above. For example, an additional set of three permanent magnets may be attached to the rear surface of disc 22 directly aligned with magnets 24, 26 and 28 to substantially increase the output power from the motor. Accordingly, it is intended by the appended claims to cover all such modifications of the invention which fall within the true spirit and scope of the invention.

I claim:

1. A magnetic motor comprising:
   (a) a rotary shaft;
   (b) a rotating disc coupled to said shaft and having first, second and third magnets positioned at 120° intervals about the face of said disc;
   (c) a pivotally mounted bracket symmetrically positioned about said shaft and having fourth and fifth magnets aligned to repel said first, second and third magnets when positioned adjacent thereto, said bracket having a first position in which said fourth magnet is positioned close to said disc and said fifth magnet is positioned away from said disc, and a second position in which said fourth magnet is positioned away from said disc and said fifth magnet is positioned close to said disc; and
   (d) means coupled to said bracket for forcefully displacing said bracket into the first position as one of said rotating magnets is passing the top dead center position and for forcefully displacing said bracket into the second position as one of said rotating magnets is passing the bottom dead center position, whereby a rotational force is imposed on said shaft.

2. The magnetic motor of claim 1 further including timing means coupled to said shaft for determining the rotational position of said magnets on said disc.

3. The magnetic motor of claim 2 wherein said displacing means further includes actuator means coupled to said timing means and to said bracket for displacing said bracket between the first position and the second position.

4. The magnetic motor of claim 3 wherein said timing means includes a cam coupled to said shaft.

5. The magnetic motor of claim 3 wherein said actuator means includes:
   (a) an electrical solenoid coupled to said bracket and displaceable between first and second position;
   (b) a source of electrical power;

(c) means coupled to said solenoid, to said source of electrical power and to said timing means for energizing said solenoid when the magnets on said disc and said bracket are properly aligned.

6. The magnetic motor of claim 5 wherein said energizing means includes a switch actuated by said timing means.

7. The magnetic motor of claim 5 wherein said solenoid includes:
(a) a shaft;
(b) a body; and
(c) means for extending and retracting said shaft with respect to said body.

8. The magnetic motor of claim 7 wherein said extending and retracting means includes an electromagnet.

9. The magnetic motor of claim 7 wherein said extending and retracting means includes:
(a) an electromagnet for retracting said shaft with respect to said body;
(b) a spring for biasing said shaft to the extended position.

10. The magnetic motor of claim 5 wherein said source of electrical power includes a battery.

* * * * *